United States Patent
Feng et al.

(10) Patent No.: US 11,995,905 B2
(45) Date of Patent: May 28, 2024

(54) OBJECT RECOGNITION METHOD AND APPARATUS, AND ELECTRONIC DEVICE AND STORAGE MEDIUM

(71) Applicant: Beijing Baidu Netcom Science Technology Co., Ltd., Beijing (CN)

(72) Inventors: Bohao Feng, Beijing (CN); Xiaoshuai Zhang, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 151 days.

(21) Appl. No.: 17/568,192

(22) Filed: Jan. 4, 2022

(65) Prior Publication Data

US 2022/0130160 A1 Apr. 28, 2022

Related U.S. Application Data

(63) Continuation of application No. PCT/CN2020/135744, filed on Dec. 11, 2020.

(30) Foreign Application Priority Data

Feb. 10, 2020 (CN) .......................... 202010085064.1

(51) Int. Cl.
*G06V 30/00* (2022.01)
*G06V 10/70* (2022.01)
(Continued)

(52) U.S. Cl.
CPC ............ *G06V 30/147* (2022.01); *G06V 10/82* (2022.01); *G06V 10/87* (2022.01); *G06V 30/1916* (2022.01)

(58) Field of Classification Search
CPC ...... G06V 30/147; G06V 10/82; G06V 10/87; G06V 30/1916; G06V 20/62; G06V 30/10; G06V 30/413; G06V 10/22; G06F 18/214
See application file for complete search history.

(56) References Cited

U.S. PATENT DOCUMENTS 9,501,853 B2 11/2016 Khan et al.
11,341,605 B1* 5/2022 Singh ...................... G06T 1/20
(Continued)

FOREIGN PATENT DOCUMENTS

CN 106682666 A 5/2017
CN 106682698 A 5/2017
(Continued)

OTHER PUBLICATIONS

Ye et al, A unified scheme of text localization and structured data extraction for joint OCR and data mining,2018 IEEE International Conference on Big Data (Big Data)—IEEE International Conference on Big Data (Big Data), pp. 2373-2382 (Year: 2018).*
(Continued)

*Primary Examiner* — Ping Y Hsieh
*Assistant Examiner* — Xiao Liu
(74) *Attorney, Agent, or Firm* — Harness, Dickey & Pierce, P.L.C.

(57) ABSTRACT

An object recognition method related to the field of artificial intelligence comprises: collecting an object to be subjected to recognition (S101); according to a target text detection model corresponding to the object to be subjected to recognition, carrying out screening and recognition on full text information corresponding to the object to be subjected to recognition, so as to obtain point-of-interest text information therefrom (S102); and carrying out recognition on the point-of-interest text information according to a preset text recognition model (S103). A target text detection model obtains point-of-interest text information by means of carrying out screening and recognition on full text information, such that the recognition of full text information in the prior art is avoided, thus saving recognition time, and improving the recognition efficiency.

9 Claims, 5 Drawing Sheets

(51) Int. Cl.
*G06V 10/82* (2022.01)
*G06V 30/146* (2022.01)
*G06V 30/19* (2022.01)

(56) References Cited

U.S. PATENT DOCUMENTS

| | | | |
|---|---|---|---|
| 2012/0092329 A1* | 4/2012 | Koo | G06V 20/63 |
| | | | 345/419 |
| 2016/0203625 A1 | 7/2016 | Khan et al. | |
| 2020/0160050 A1* | 5/2020 | Bhotika | G06V 30/414 |

FOREIGN PATENT DOCUMENTS

| | | | | |
|---|---|---|---|---|
| CN | 107291743 A | | 10/2017 | |
| CN | 107292302 A | | 10/2017 | |
| CN | 109034159 A | | 12/2018 | |
| CN | 109635627 A | * | 4/2019 | |
| CN | 109919014 A | | 6/2019 | |
| CN | 109934227 A | | 6/2019 | |
| CN | 110008944 A | | 7/2019 | |
| CN | 110032969 A | | 7/2019 | |
| CN | 110490181 A | | 11/2019 | |
| CN | 110490246 A | | 11/2019 | |
| CN | 110569850 A | * | 12/2019 | G06K 9/344 |
| CN | 110647829 A | | 1/2020 | |
| CN | 111291742 A | | 6/2020 | |
| JP | H03231391 A | | 10/1991 | |
| KR | 20070113334 A | | 11/2007 | |

OTHER PUBLICATIONS

Lyu et al, Multi-Oriented Scene Text Detection via Corner Localization and Region Segmentation, arXiv:1802.08948v2 Feb. 27, 2018.*
Mammeri et al, Road-Sign Text Recognition Architecture for Intelligent Transportation Systems, IEEE 80th Vehicular Technology Conference (VTC2014—Fall) (Year: 2014).*
Office Action in corresponding Chinese Patent Application No. 202010085064.1 dated Feb. 21, 2023.
International Search Report and Written Opinion of the International Search Authority, issued in PCT/CN2020/135744, dated Mar. 10, 2021.
Extended European Search Report dated Jun. 13, 2023, in corresponding European Application No. 2091891.8.
Notice of Registration dated Jul. 1, 2023, in corresponding Chinese Application No. 202010085064.1.
Office Action dated Jun. 25, 2023, in corresponding Korean Application No. 10-2021-7022851.
Office Action dated May 31, 2023, in corresponding Japanese Application No. 2021-572659.

* cited by examiner

OBJECT RECOGNITION METHOD AND APPARATUS, AND ELECTRONIC DEVICE AND STORAGE MEDIUM

CROSS-REFERENCE TO RELATED APPLICATIONS

The present application is a continuation of International Application No. PCT/CN2020/135744, filed on Dec. 11, 2020, which claims priority to Chinese Patent Application No. CN202010085064.1, filed on Feb. 10, 2020 and entitled "OBJECT RECOGNITION METHOD, APPARATUS, ELECTRONIC DEVICE AND STORAGE MEDIUM", both applications are hereby incorporated by reference in their entireties.

TECHNICAL FIELD

The present disclosure relates to the technical field of data processing, and in particular, to the technical field of artificial intelligence, specifically to an object recognition method, an apparatus, an electronic device and a storage medium.

BACKGROUND

Optical Character Recognition (OCR) mainly generates text output by recognizing optical characters displayed on a carrier. Taking the OCR of paper documents as an example, text information and other data can be obtained by: obtaining optical characters through collecting printed letters on the paper documents and then recognizing them. For example, OCR templates of different cards, bills, newspapers and textbooks are tailor-made by the OCR recognition method, based on which the corresponding objects to be recognized (cards, bills, newspapers, textbooks, etc.) are recognized.

In the prior art, entire text information of an object to be recognized (such as all texts in an image corresponding to the object to be recognized, etc.) are detected by a text detection model in an OCR template to obtain detection results, which are then recognized based on the text recognition model in the OCR template.

However, in the process of implementing the present application, the inventor found that the above prior art has at least the following technical problem: lower recognition efficiency due to the recognition of entire text information of the object to be recognized by the text detection model.

SUMMARY

There is provided an object recognition method, an apparatus, an electronic device and a storage medium.

According to an aspect of the embodiments of the present application, an embodiment of the present application provides an object recognition method, which includes:
collecting an object to be recognized;
identifying, according to a target text detection model corresponding to the object to be recognized, point-of-interest (POI) text information from entire text information corresponding to the object to be recognized; and
recognizing the POI text information according to a preset text recognition model.

In this embodiment of the present application, a target text detection model is used to identify the POI text information from entire text information corresponding to the object to be recognized, thus avoiding the recognition of the entire text information in the prior art, saving the recognition time and improving the recognition efficiency.

In some embodiments, before the identifying, according to a target text detection model corresponding to the object to be recognized, POI text information from entire text information corresponding to the object to be recognized, the method further includes:
generating a detection box corresponding to a collected sample object by adopting an initial text detection model;
determining, according to the detection box, a detection box corresponding to preset POI text information; and
training the initial text detection model according to the determined detection box to generate the target text detection model.

In this embodiment of the present application, the detection box corresponding to the POI text information is determined and used to train the initial text detection model based on the determined detection box to generate the target text detection model, which can identify from the entire text information the POI text information, thereby improving the efficiency of recognizing the object to be recognized.

In some other embodiments, the determining, according to the detection box, a detection box corresponding to preset POI text information includes:
performing a modifying operation and/or a deleting operation on the detection box according to the POI text information, where the modifying operation includes at least one of the following: line modification, text modification and four-corner position modification.

In some other embodiments, after the determining, according to the detection box, a detection box corresponding to preset POI text information, the method further includes:
recognizing, according to the preset text recognition model, text information corresponding to the determined detection box to obtain a recognition result;
verifying, based on a first key value pair corresponding to the POI text information, a second key value pair in the recognition result;
and the training the initial text detection model with the determined detection box includes:
in response to the second key value pair of the recognition result being consistent with the first key value pair corresponding to the POI text information, training the initial text detection model according to the determined detection box.

In this embodiment of the present application, the verification based on key value pairs serves as a trigger condition of training. This can ensure the validity and accuracy of the training data, thus realizing the reliability of training outcome and realizing the accuracy of recognition.

In some embodiments, after the identifying, according to a target text detection model corresponding to the object to be recognized, POI text information from entire text information corresponding to the object to be recognized, the method further includes:
determining a text type corresponding to the POI text information;
and the recognizing the POI text information according to a preset text recognition model includes:
selecting a text recognition model corresponding to the text type, and recognizing the POI text information according to the selected text recognition model.

In this embodiment of the present application, different text recognition models are selected to recognize the POI text information of different text types, so as to realize targeted recognition, thereby improving the efficiency and accuracy of recognition.

According to another aspect of the embodiments of the present application, an embodiment of the present application further provides an object recognition apparatus, the apparatus including:
- a collection module, configured to collect an object to be recognized;
- a detection module, configured to identify, according to a target text detection model corresponding to the object to be recognized, point-of-interest (POI) text information from entire text information corresponding to the object to be recognized; and
- a recognition module, configured to recognize the POI text information according to a preset text recognition model.

In some embodiments, the apparatus further includes:
- a training module, configured to: generate a detection box corresponding to a collected sample object by adopting an initial text detection model; determine, according to the detection box, a detection box corresponding to preset POI text information; and train the initial text detection model according to the determined detection box to generate the target text detection model.

In some embodiments, the training module is configured to perform a modifying operation and/or a deleting operation on the detection box according to the POI text information, where the modifying operation includes at least one of the following: line modification, text modification and four-corner position modification.

In some embodiments, the training module is configured to recognize, according to the preset text recognition model, text information corresponding to the determined detection box to obtain a recognition result; verify, based on a first key value pair corresponding to the POI text information, a second key value pair in the recognition result; and in response to the second key value pair of the recognition result being consistent with the first key value pair corresponding to the POI text information, training the initial text detection model according to the determined detection box.

In some embodiments, the apparatus further includes:
- a determination module is, configured to determine a text type corresponding to the POI text information;
- and the recognition module is configured to: select a text recognition model corresponding to the text type; and recognize the POI text information according to the selected text recognition model.

According to still another aspect of the embodiments of the present application, an embodiment of the present application further provides an electronic device, including:
- at least one processor; and
- a memory communicatively connected to the at least one processor, where:
  the memory stores instructions executable by the at least one processor, and the instructions are executed by the at least one processor to enable the at least one processor to perform the method according to any one of the above embodiments.

According to still another aspect of the embodiments of the present application, an embodiment of the present application further provides a non-transitory computer readable storage medium storing computer instructions which are used to cause the computer to perform the method according to any one of the above embodiments.

According to still another aspect of the embodiments of the present application, an embodiment of the present application further provides a computer program including program codes which, when run by a computer, perform the method according to any one of the above embodiments.

According to still another aspect of the embodiments of the present application, an embodiment of the present application further provides a computer program product including a computer program which, when executed by a processor, implements the method according to any one of the above embodiments.

The embodiments of the present application have provided an object recognition method, an apparatus, an electronic device, and a storage medium, including: collecting an object to be recognized; identifying, according to a target text detection model corresponding to the object to be recognized, POI text information from entire text information corresponding to the object to be recognized; and recognizing the POI text information according to a preset text recognition model. In the embodiments of the present application, the target text detection model picks out and recognizes POI text information from entire text information, which avoids the recognition of the entire text information in the prior art, saves the recognition time, and improves the efficiency of recognition.

It should be understood that what is described in this section is not intended to identify key or important features of the embodiments of the present disclosure, nor is it intended to limit the scope of the present disclosure. Other features of the present disclosure will become apparent from the following description.

BRIEF DESCRIPTION OF THE DRAWINGS

The accompanying drawings are for better understanding of the technical solution and do not constitute a limitation on the present application. In the drawings.

DESCRIPTION OF EMBODIMENTS

The exemplary embodiments of the present application are described below with reference to the accompanying drawings, including various details of the embodiments of the present application that are useful for understanding the present application, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted below.

According to the above background technology, in the prior art, in order to efficiently and quickly identify different cards, bills, newspapers, textbooks and the like, a corresponding OCR recognition template is typically developed by the OCR recognition method. When the corresponding OCR recognition template is formulated, the OCR recognition template is generated by collecting the corresponding sample data and training with the sample data. In addition, in the prior art, in order to ensure the reliability of recognition, large amount of sample data will be selected, and in the training process, the detection and recognition are performed on all text information.

The inventor of the present application thought of, after creative labor, recognizing the object to be recognized based on part of the text information, for example, POI text information selected from entire text information. In this way, sample data can be reduced to some extent. In the recognition process, since the text information of the object to be recognized is relatively reduced, efficiency of recognition can be relatively improved; and since the POI text information is picked out from entire text information, noise information can be reduced and accuracy of recognition can be improved.

In other words, in the prior art, the idea to improve the accuracy and efficiency of recognition is to increase sample data as much as possible and recognize entire text information in the sample data as much as possible. Instead, the idea adopted by the inventor of the present application is to reduce the sample data as much as possible and reduce the amount of text information for recognition as much as possible.

The technical solution of the present application and how it solves the above technical problems will be described in detail below with specific embodiments. Following specific embodiments can be combined with each other, and the same or similar concepts or processes may be omitted from some embodiments for the sack of brevity. Embodiments of the present application will be described with reference to the accompanying drawings.

According to an aspect of the embodiments of the present application, an embodiment of the present application provides an object recognition method.

Figure 1:
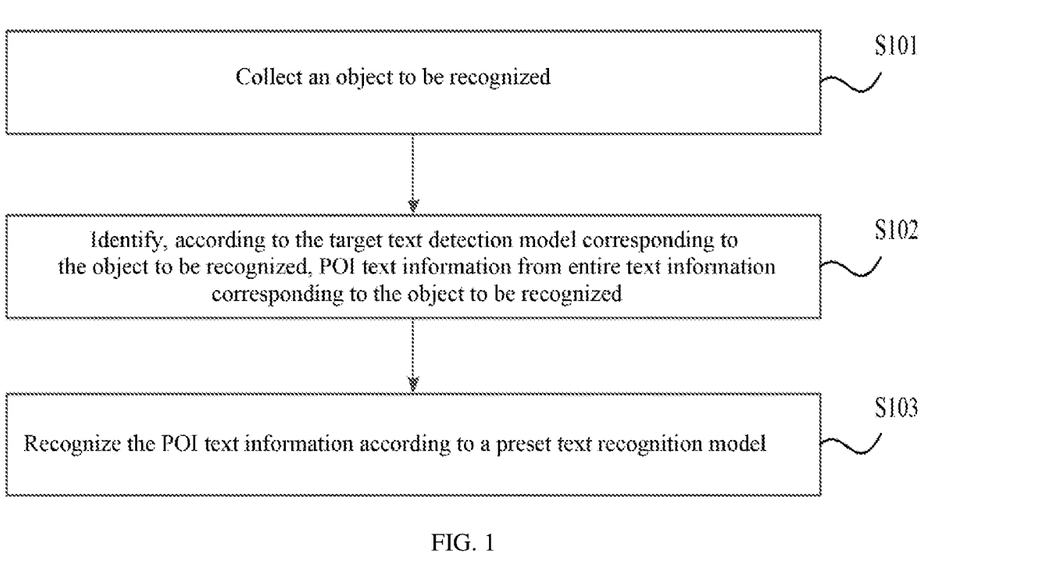
FIG. 1 is a schematic flowchart of an object recognition method according to an embodiment of the present application.

Please refer to FIG. 1, which is a schematic flowchart of an object recognition method according to an embodiment of the present application.

As shown in FIG. 1, the method includes:

S101, collect an object to be recognized.

The object to be recognized is an object that can be recognized by an OCR recognition template. For example, the objects to be recognized include cards, bills, newspapers and textbooks.

In some embodiments, the object to be recognized may be collected by an image capture device, where the image capture device includes a scanner and a camera.

S102, Identify, according to the target text detection model corresponding to the object to be recognized, POI text information from entire text information corresponding to the object to be recognized.

This step may specifically include: determining an OCR recognition template corresponding to the object to be recognized; determining a target text detection model in the OCR recognition template; picking out features of point-of-interest (POI) from entire text information corresponding to the object to be recognized based on the target text detection model, and performing text detection on the features of POI to obtain POI text information.

It can be seen based on the above examples that different objects to be recognized correspond to different OCR recognition templates, and an OCR recognition template includes two parts: a text detection model and a text recognition model. The text detection model is configured to detect the object to be recognized and obtain the text information of the object to be recognized; and the text recognition model is configured to recognize the text information and derive recognition results.

In an embodiment of the present application, a mapping relationship between the object to be recognized and the OCR recognition template, such as a mapping table and an index number, can be pre-constructed, so that after the object to be recognized is collected, the OCR recognition template corresponding to the object to be recognized can be determined based on the mapping relationship.

The target text detection model is obtained by training with the POI text information, which will be elaborated later.

Entire text information, as its name implies, are the information of the entire texts, that is, the information of all texts corresponding to the entire object to be recognized. Compared with the concept of entire text information, the POI text information refers to only part of the text information, that is, the text information of a part of the object to be recognized corresponding to a point-of-interest (POI), while a POI refers to text information of points calling for attention in the object to be recognized. The POI may be selected based on the user. For example, taking the object to be recognized as a business card as an example, the POI can be the company information and position information pre-selected by the user as needed. The POI may also be determined based on survey data collected in advance about the object to be recognized, that is, the sections of the business card that interest different groups of people are determined based on the survey data—and the POI is then determined after clustering and other processing.

Upon the above analysis, it can be seen that in this step, the target text detection model is used to identify POI text information from entire text information corresponding to an object to be recognized. This method reduces, comparing with the recognition of entire text information in the prior art, the amount of noise data and data for recognition and improves the efficiency and reliability of recognition.

S103, recognize the POI text information according to a preset text recognition model.

Based on S102, after the target text detection model is applied, the output POI text information is part of the entire text information. Therefore, in this step, the amount of data recognized by the text recognition model is relatively small, which can further improve the efficiency of recognition.

Based on the above examples, it can be known that the target text detection model is obtained by training with the POI text information. Now, a method for obtaining the target text detection model according to embodiments of the present application will be described in detail with reference to FIG. 2.

Figure 2:
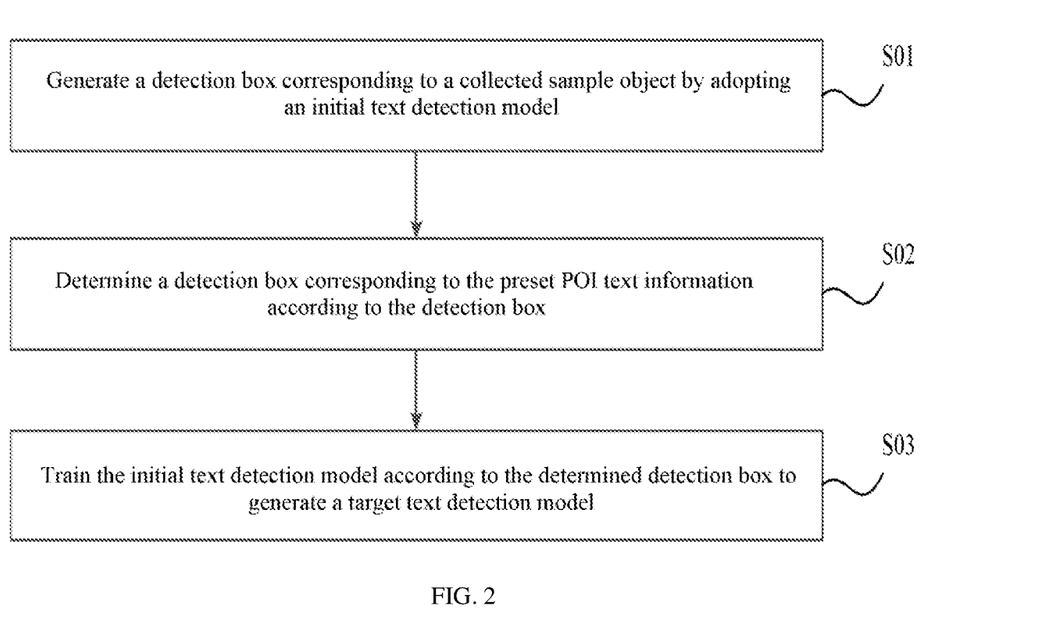
FIG. 2 is a schematic flowchart of a method for obtaining a target text detection model according to an embodiment of the present application.

As shown in FIG. 2, the method for obtaining the target text detection model includes:

S01, generate a detection box corresponding to a collected sample object by adopting an initial text detection model.

The initial text detection model is a text detection model in the prior art, which can be generated by training based on a neural network model and sample data, and details of which will not be repeated herein.

The detection box is configured to characterize a detection area of the sample object and information (the text information, etc.) in the detection area.

Before S01, the step of collecting the sample object is also included.

In some embodiments, the sample objects can be collected by a preset image capture device, including a scanner and a camera, as well as a set upload window, through which the user may upload the sample object.

In order to ensure the reliability of the training process, the collected sample objects can be preprocessed first.

For example, subject extraction is performed on the sample object, that is, the subject of the sample object is separated from the background. Specifically, the subject of the sample object may be extracted by a model to remove the interference of the background. The model for the image segmentation may be used as the subject extraction model, such as a semantic image segmentation model Deep-LabV3+, or, e.g., an industrial segmentation model library PaddleSeg, and so on.

After the subject extraction, inclination correction can be performed on the sample object obtained therefrom.

For example, due to the shooting angle and other issues, the sample object may have a certain inclination, which is then corrected. Specifically, a correction algorithm of the open source computer vision library Opencv can be used to complete the correction of the sample object after the subject extraction.

After the correction, the corrected sample object can be scaled.

For example, after scaling, the text positions of different sample objects are close to each other to facilitate training, thus improving the reliability of training and reducing training errors. Specifically, zoom-in can be achieved using a super-resolution algorithm SRCNN, and zoom-out can be achieved using a zoom-out algorithm of the open source computer vision library Opencv.

After scaling, the scaled sample object can be enhanced.

For example, in order to enhance the contrast of the scaled sample object and improve the recognition rate, image enhancement can be performed on the scaled sample object. Specifically, the sharpening process of open source computer vision library Opencv can be adopted to make edges of the scaled sample object clearer. More specifically, the sharpening can be accomplished by using the second derivative, for example, using the Laplacian pick out and weighted pixel superposition of the scaled sample object to complete the sharpening.

S02, determine a detection box corresponding to the preset POI text information according to the detection box.

In some embodiments, this step may specifically include performing a modifying operation and/or a deleting operation on the detection box according to the POI text information, where the modifying operation includes at least one of line modification, text modification and position modification of four-corner point.

Based on the above examples, it can be seen that the POI text information can be the text information corresponding to the POI selected by the user or the text information corresponding to the preset POI, and the preset POI can be generated based on the survey data. This step is described in detail by taking the POI text information as the text information corresponding to the POI selected by the user as an example.

When generating the detection box based on the initial text detection model, the detection box can be presented, for example, by a display device.

The user can modify or delete the detection box based on the POI text information (that is, the information of the text of the point that interests the user).

For example, if there are italic characters in the texts in a certain detection box, the user can adaptively adjust the italic characters. For another example, if some characters in a detection box are beyond the detection box, the user can adaptively adjust the size of the detection box. Specifically, the line of the detection box or the positions of the four-corner point of the detection box can be adaptively adjusted. For another example, if text information in a certain detection box is not the POI text information, that is, if the text information in the detection box is not interesting to the user, the user can delete the detection box. The examples can still go on.

S03, train the initial text detection model according to the determined detection box to generate a target text detection model.

In this step, the initial text detection model is trained for the second time with the determined detection box, so as to generate the target text detection model.

It is worth noting that, compared with training twice, generating the target text detection model by such a secondary training can improve the efficiency of generating the target text detection model and save the training cost.

Figure 3:
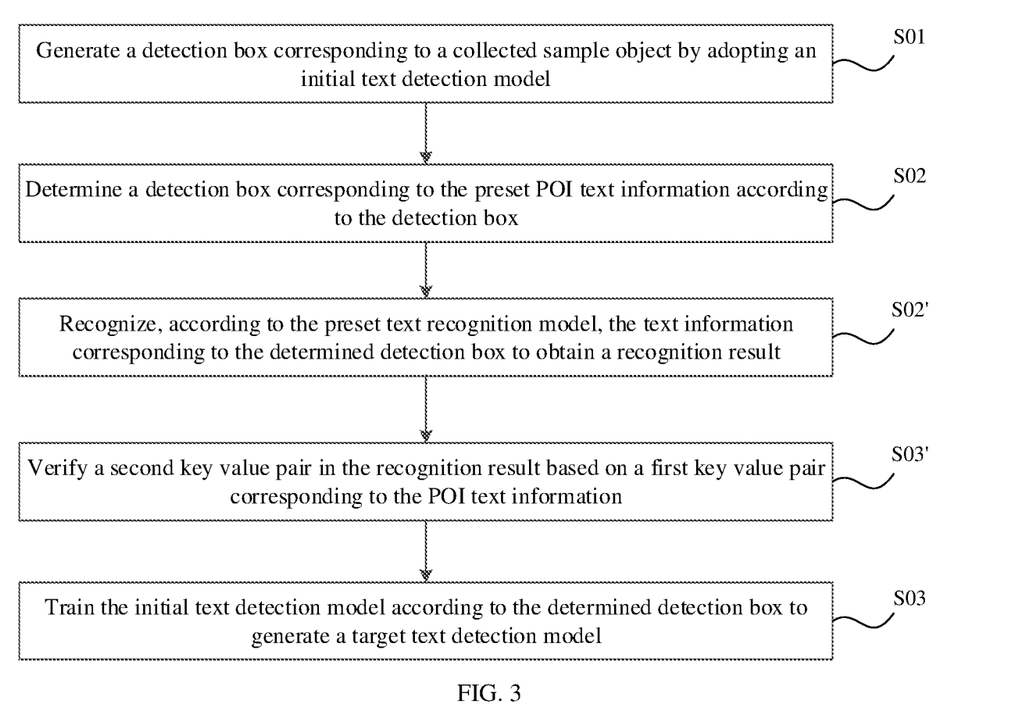
FIG. 3 is a schematic flowchart of a method for obtaining a target text detection model according to another embodiment of the present application.

According to FIG. 3, in some embodiments, after S02, the method further includes:

S02', recognize, according to the preset text recognition model, the text information corresponding to the determined detection box to obtain a recognition result.

In the embodiments of the present application, the specific recognition method can be found in the prior art, and will not be repeated herein.

S03', verify a second key value pair in the recognition result based on a first key value pair corresponding to the POI text information.

Verifying the second key value pair in the recognition results based on the first key value pair corresponding to the POI text information can determine whether the second key value pair in the recognition result is consistent with the first key value pair corresponding to the POI text information. That is, the process of verifying the two key value pairs can be understood as a process of determining whether the two key value pairs are the same.

Additionally, S03 includes: training the initial text detection model according to the determined detection box in response to the second key value pair of the recognition result being consistent with the first key value pair corresponding to the POI text information.

It is worth noting that when verifying the first key value pair corresponding to the POI text information based on the second key value pair of the recognition result, the verification result may be that the second key value pair of the recognition result is inconsistent with the first key value pair corresponding to the POI text information. For example, if it is known from the second key value pair of the recognition result that A is a key (such as a first name) while it is known from the first key value pair corresponding to the POI text information that A is a value (such as a last name, etc.), it means that the sample data corresponding to the recognition result may be abnormal sample data. In this case, the detection box corresponding to the recognition result can be deleted, or be adaptively modified for subsequent training.

For another example, if it can be known from the second key value pair of the recognition result that A is a key (such as a first name, etc.) while it is known from the first key value pair corresponding to the POI text information that A is also a key (such as a first name, etc.), it means that the sample data corresponding to the recognition result may be normal sample data, and the detection box corresponding to the result can be used as input information for subsequent training.

In an embodiment of the present application, the verification based on the key value pairs can exclude abnormal sample data, leaving normal sample data for training based on the detection box corresponding to the normal sample data, which can improve the reliability and accuracy of the training outcome, and ensure the reliability and accuracy of the target text detection model, thereby achieving the technical effect of accurate and effective recognition.

Figure 4:
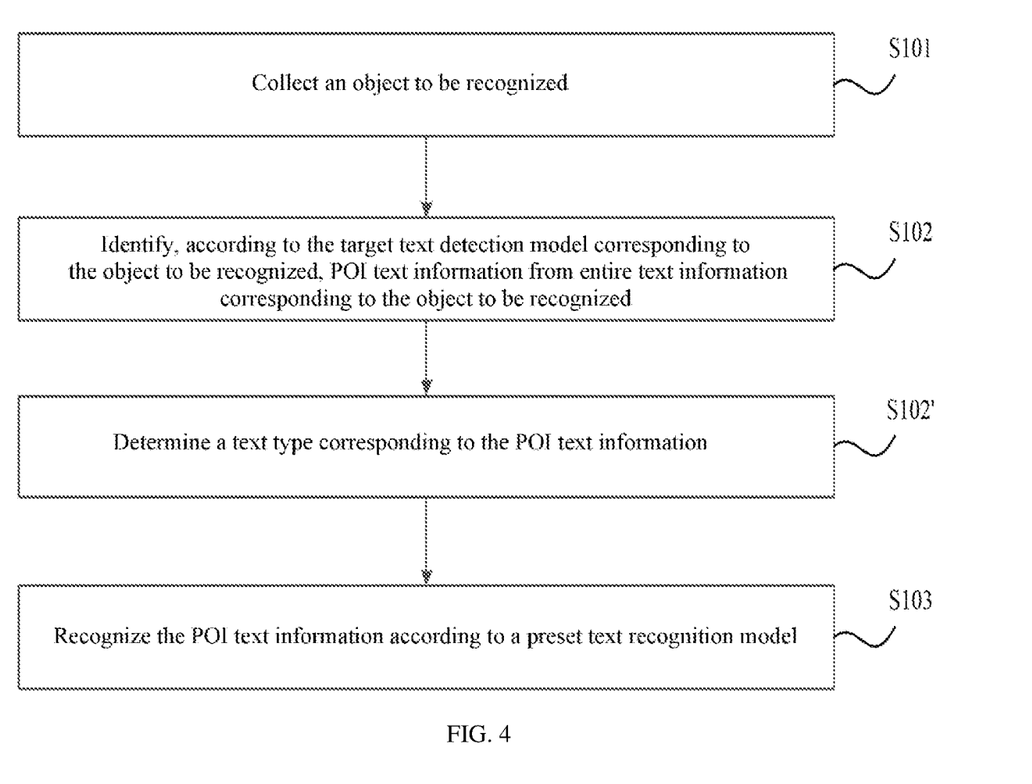
FIG. 4 is a schematic flowchart of an object recognition method according to another embodiment of the present application.

In some embodiments, it can be seen from FIG. 4 that after S102, the method further includes:

S102', determine a text type corresponding to the POI text information.

It is worth noting that in order to ensure the reliability and accuracy of the recognition result and improve the efficiency of recognition, in this embodiment of the present application, determining the text types corresponding to the POI text information enables selecting the corresponding text type based on different POI text information, so as to adaptively select a text recognition model for recognition based on different text types in later stages.

The text types include, but are not limited to, text, handwriting and letters.

In some embodiments, the POI text information can be analyzed to obtain the corresponding text type.

In other embodiments, in combination with the above examples, the POI text information can be generated based on interactions with the user. Therefore, the text type corresponding to the POI text information can also be stored in advance based on the interaction with the user.

For example, based on the interaction with the user, the text type selected by the user for the text information in the detection box is stored, and when the POI text information needs to be recognized, the text recognition model corresponding to the stored text type is called.

Additionally, S103 may include: selecting a text recognition model corresponding to the text type, and recognizing the POI text information according to the selected text recognition model.

For example, if the text type corresponding to the POI text information is handwriting, the POI text information is recognized based on a handwriting text recognition model.

It is worth noting that different regions in the POI text information may correspond to different text types, so different text recognition models are selected for different regions, so as to recognize different regions based on the different text recognition models.

Figure 5:
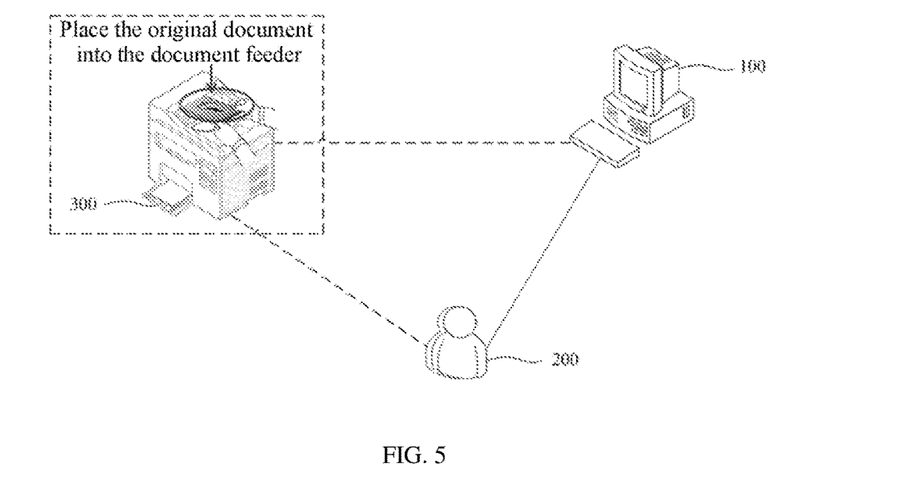
FIG. 5 is a schematic diagram of an application scenario of an object recognition method according to an embodiment of the present application.

For a deeper understanding of the solutions and effects of the embodiments of the present application, an object recognition method of an embodiment of the present application will be described in detail with reference to FIG. 5 (FIG. 5 is a schematic diagram of an application scenario of an object recognition method according to an embodiment of the present application). The execution subject of this embodiment of the present application is an object recognition apparatus, and as shown in FIG. 5, the object recognition apparatus can include a computer 100, and the object recognition method of this embodiment of the present application is implemented through the interaction between the user 200 and the computer 100.

The embodiments of the present application can be divided into two parts, one is the training part and the other is the recognition part.

Specifically, the training part includes training an OCR recognition template which can include a text detection model and a text recognition model. The text detection model is used to recognize the object to be recognized to obtain text information corresponding to the object to be recognized. It should be noted that in the prior art, the text detection model is used to recognize the object to be recognized to obtain entire text information of the object to be recognized. But in this embodiment, the text detection model recognizes the object to be recognized to obtain the POI text information of the object to be recognized. The reason why the text detection model in this embodiment of the present application can obtain the POI text information after recognition will be explained in detail below in conjunction with the principles of training.

In order to distinguish between the recognition objects that are collected in the training process and the objects recognized by OCR recognition templates that had been obtained by training, the recognition objects in the training process are called sample objects and the objects in the recognition process are called objects to be recognized. Additionally, in order to distinguish between the training model, which is the basis in the training process, and the model obtained by training, "initial" and "target" are added in front of the models to limit them, and so on.

As shown in FIG. 5, a computer 100 collects a sample object input by a user 200.

In some embodiments, the computer 100 may provide and display a window for uploading sample objects, which are then transmitted by the user 200 to the computer 100 through the window.

Of course, in other embodiments, as shown in FIG. 5, a scanner 300 may also be provided, and the scanner 300 is communicatively connected with the computer 100. The user 200 places the sample object into the scanner 300 (refer to the placement mode illustrated in FIG. 5), and the scanner 300 scans the sample object and transmits the scanned sample object to the computer 100.

Figure 6:
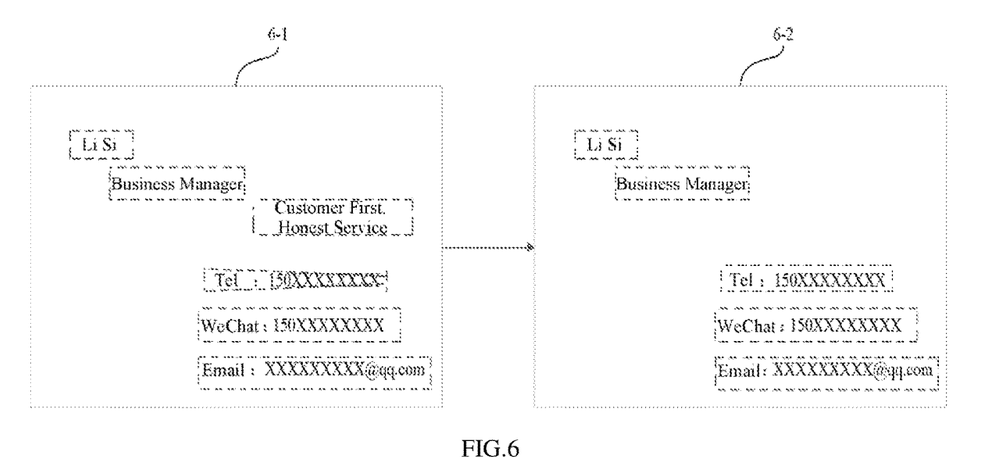
FIG. 6 is a schematic diagram of an interface displayed according to an embodiment of the present application.

The computer 100 calls the pre-stored initial text detection model to recognize the sample object, and generates and displays a corresponding detection box, as can be seen by referring to 6-1 in FIG. 6 (the detection box is represented by the dotted box).

The user 200 performs an adaptive operation on the detection box to generate a detection box corresponding to the POI text information.

In this step, because the interaction between the user 200 and the computer 100 is involved, the adaptive operation performed by the user may be performed as required, that is, the user sets the POI mentally and performs the adaptive operation to create the detection box corresponding to the POI text information.

As shown in 6-1 in FIG. 6, the user deleted the detection box "Customer First. Honest Service" and modified the position of four-corner points of the detection box "Telephone: 150XXXXXXXX". Refer to 6-2 in FIG. 6 for the revised figure.

Take the data shown in 6-2 in FIG. 6 as the sample data for the secondary training, and carry out secondary training for the initial text detection model based on the sample data to generate the target text detection model.

In some embodiments, the sample size of the training sample object can be set as required. If the user interaction is adopted, a relatively small sample size can be adopted. For example, if the sample size can be set to ten, the computer 100 takes the sample data generated by the user 200 after performing adaptive operation on ten sample objects as the data for the secondary training.

In addition, the user 200 can select the text type of the detection box corresponding to the POI text information, such as the detection box "Telephone: 150XXXXXXXX", and the user 200 can select the number type, so as to call the pre-stored text recognition model corresponding to the number type in the recognition process by the computer 100, and such text recognition model is used to recognize the detection box, thereby improving the efficiency of recognition.

If the recognition accuracy meets the preset requirements after iterative training, an OCR recognition template including both a target text detection model and a text recognition model is generated.

At this point, the training part ends.

In the recognition part, the user 200 also inputs the object to be recognized into the computer 100 in the above manner.

The computer 100 selects the OCR recognition template corresponding to the object to be recognized from the OCR recognition templates obtained after training by the above method, so as to recognize the object to be recognized based on the OCR recognition template.

Specifically, the computer 100 first calls the target text detection model in the OCR recognition template to recognize the object to be recognized, to obtain the POI text information corresponding to the object to be recognized.

It is worth noting that in the training part, the target text detection model is obtained by secondary training of the initial text detection model based on the POI text information. Therefore, the text information of the object to be recognized and the POI text information can be recognized based on the target text detection model, thereby reducing the workload for recognition and improving the efficiency of recognition.

After the POI text information is recognized, it can be analyzed, or a corresponding text recognition model can be called based on the text type selected by the user 200.

At this point, the recognition part ends.

It is worth noting that the above examples are only exemplary illustrations of the embodiments of the present application combination with application scenarios, and cannot be understood as limiting the scope of the disclosed embodiments.

According to another aspect of the embodiments of the present application, an embodiment of the present application further provides an object recognition apparatus.

Figure 7:
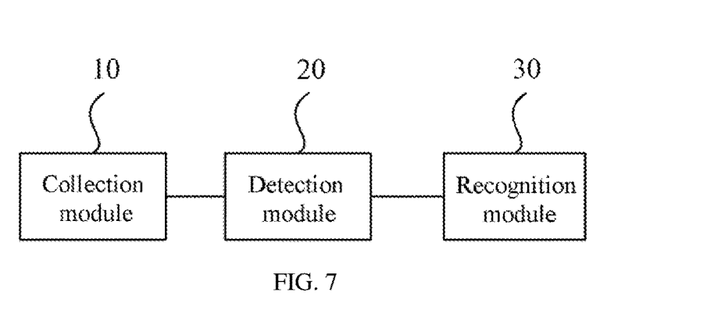
FIG. 7 is a schematic diagram of an object recognition apparatus according to an embodiment of the present application.

Please refer to FIG. 7. FIG. 7 is a schematic diagram of an object recognition apparatus according to an embodiment of the application.

As shown in FIG. 7, the apparatus includes:
a collection module 10, configured to collect an object to be recognized;
a detection module 20, configured to identify, according to a target text detection model corresponding to the object to be recognized, point-of-interest (POI) text information from entire text information corresponding to the object to be recognized; and
a recognition module 30, configured to recognize, based on a preset text recognition model, the POI text information.

Figure 8:
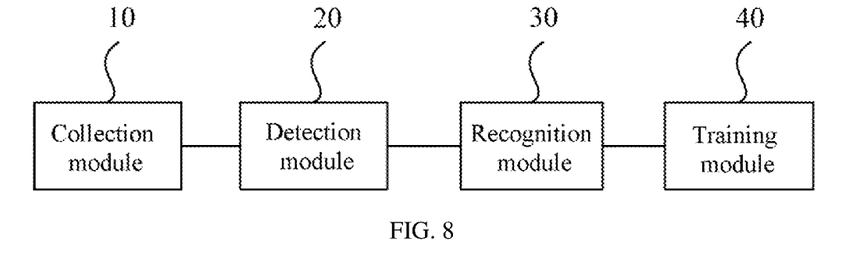
FIG. 8 is a schematic diagram of an object recognition apparatus according to another embodiment of the present application.

In some embodiments, it can be seen, with reference to FIG. 8, that the apparatus further includes:

a training module 40, configured to: generate a detection box corresponding to a collected sample object by adopting an initial text detection model; determine, according to the detection box, a detection box corresponding to preset POI text information; and train the initial text detection model according to the determined detection box to generate the target text detection model.

In some embodiments, the training module 40 is configured to perform a modifying operation and/or a deleting operation on the detection box according to the POI text information, where the modifying operation includes at least one of the following: line modification, text modification and four-corner position modification.

In some embodiments, the training module 40 is configured to recognize, according to the preset text recognition model, text information corresponding to the determined detection box to obtain a recognition result; verify, based on a first key value pair corresponding to the POI text information, a second key value pair in the recognition result; and in response to the second key value pair of the recognition result being consistent with the first key value pair corresponding to the POI text information, training the initial text detection model according to the determined detection box.

Figure 9:
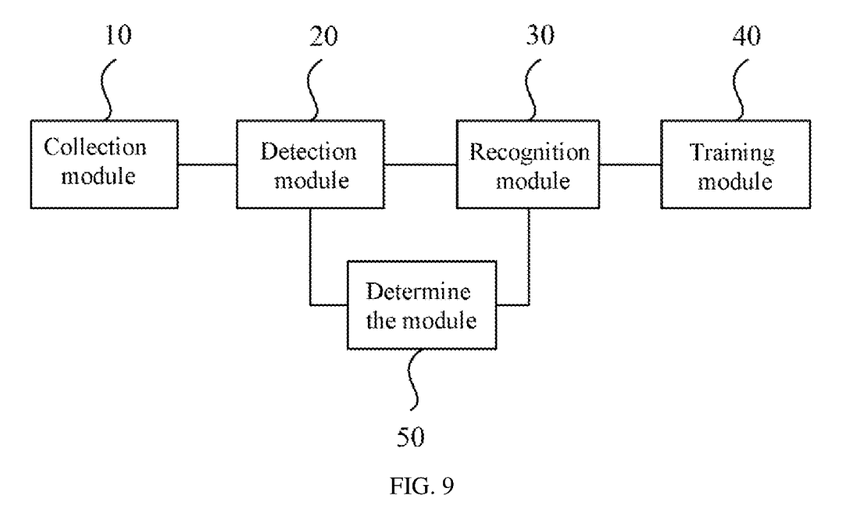
FIG. 9 is a schematic diagram of an object recognition apparatus according to still another embodiment of the present application.

In some embodiments, it can be seen, in conjunction with FIG. 9, that the apparatus further includes:
a determination module 50, configured to determine a text type corresponding to the POI text information;
and the recognition module 30 is configured to: select a text recognition model corresponding to the text type; and recognize the POI text information according to the selected text recognition model.

According to still another aspect of the embodiments of the present application, the present application also provides an electronic device and a readable storage medium.

According to the embodiments of the present application, the present application also provides an electronic device and a readable storage medium.

Figure 10:
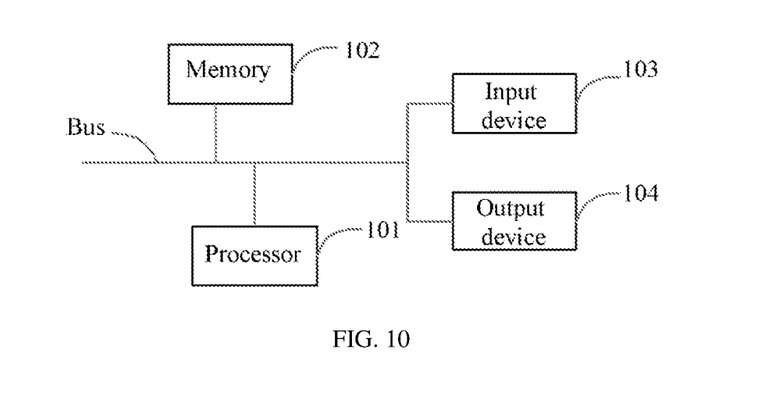
FIG. 10 is a block diagram of an electronic device according to an embodiment of the present application.

As shown in FIG. 10, FIG. 10 is a block diagram of an electronic device according to an embodiment of the present application. The electronic device represents various forms of digital computers, such as laptop computers, desktop computers, workstations, personal digital assistants, servers, blade servers, mainframe computers and other suitable computers. The electronic device may also represent various forms of mobile devices, such as personal digital assistants, cellular phones, smart phones, wearable devices and other similar computing devices. The components shown herein, their connections and relationships, and their functions are merely illustrative of and not restrictive on the implementation of the present application described and/or required herein.

As shown in FIG. 10, the electronic device includes one or more processors 101, a memory 102, and interfaces for connecting various components, including a high-speed interface and a low-speed interface. The various components are connected to each other by different buses, and can be mounted on a common main board or in other ways as required. The processor may process instructions executed within the electronic device, including instructions stored in or on the memory to display graphical information of the GUI on an external input/output device, such as a display device coupled to an interface. In other embodiments, multiple processors and/or multiple buses may be used with multiple memories and multiple memories, if desired. Similarly, multiple electronic devices can be connected, and each device provides some necessary operations (for example, as a server array, a group of blade servers, or a multiprocessor system). In FIG. 10, a processor 101 is taken as an example.

The memory 102 is a non-transitory computer-readable storage medium provided by an embodiment of the present application. The memory stores instructions executable by at least one processor to enable the at least one processor to perform the object recognition method provided by the embodiments of the present application. The non-transitory computer-readable storage medium of the embodiments of the present application stores computer instructions, which are used to make a computer perform the object recognition method provided by the embodiments of the present application.

As a non-transitory computer-readable storage medium, the memory 102 can be used to store non-transitory software programs, non-transitory computer executable programs and modules, such as the corresponding program instructions/modules recommended in the embodiments of the present application. The processor 101 executes various functional applications and data processing of the server by running non-instantaneous software programs, instructions and modules stored in the memory 102, that is, to implement the object recognition method in the above method embodiment.

The memory 102 can include a program storage area and a data storage area, where the program storage area may store an operating system and an application program required by at least one function; the data storage area may store data, etc., created according to the use of electronic device. In addition, the memory 102 may include a high-speed random access memory, and may also include a non-transitory memory, such as at least one magnetic disk storage device, a flash memory device, or other non-transitory solid-state storage devices. In some embodiments, the memory 102 may optionally include a memory remotely provided with respect to the processor 101, and these remote memories may be connected to an electronic device through a network. Examples of the above networks include, but are not limited to, the Internet, corporate intranets, local area networks, Block-chain-based Service Network (BSN), mobile communication networks, and combinations thereof.

The electronic device may further include: an input device 103 and an output device 104. The processor 101, the memory 102, the input device 103 and the output device 104 may be connected via a bus or in other ways, and FIG. 10 illustrates the connection with a bus as an example.

The input device 103 can receive input digital or character information, and generate key signal input related to user settings and function control of electronic device, for example, a touch screen, a keypad, a mouse, a track pad, a touchpad, a pointing stick, one or more mouse buttons, a trackball, a joystick and other input devices. The output device 104 may include a display device, an auxiliary lighting device (for example, LED), a tactile feedback device (for example, a vibration motor), and the like. The display device may include, but is not limited to, a liquid crystal display (LCD), a light emitting diode (LED) display and a plasma display. In some implementations, the display device may be a touch screen.

Various implementations of the systems and technologies described herein can be implemented in digital electronic circuit systems, integrated circuit systems, application specific integrated circuits (ASICs), computer hardware, firmware, software, and/or combinations thereof. These various implementations may include: implemented in one or more computer programs, where the one or more computer programs may be executed and/or interpreted on a programmable system including at least one programmable processor, the programmable processor may be a dedicated or general programmable processor, and may receive data and instructions from a storage system, at least one input device, and at least one output device and transmit data and instructions to the storage system, the at least one input device and the at least one output device.

These computing programs (also called programs, software, software applications, or codes) include machine instructions for programmable processors, and can use high-level process and/or object-oriented programming language, and/or assembly/machine language to implement these computing programs. As used herein, the terms "machine-readable medium" and "computer-readable medium" refer to any computer program product, device, and/or apparatus used to provide machine instructions and/or data to a programmable processor (for example, magnetic disks, optical disks, memory, programmable logic devices (PLD)), including machine-readable media that receive machine instructions as machine-readable signals. The term "machine-readable signal" refers to any signal used to provide machine instructions and/or data to a programmable processor.

In order to provide for interaction with users, the systems and techniques described here can be implemented on a computer, and the computer has: a display device (for example, a cathode ray tube (CRT) or liquid crystal display (LCD) monitor) for displaying information to the user; as well as a keyboard and a pointing device (for example, a mouse or a trackball), the user can provide input to the computer through the keyboard and the pointing device. Other types of devices can also be used to provide interaction with users; for example, the feedback provided to the user can be any form of sensory feedback (for example, visual feedback, auditory feedback or tactile feedback); and any form (including sound input, voice input or tactile input) can be used to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the system and technology described herein), or a computing system that includes any combination of such back-end components, middleware components, or front-end components. The components of the system can be connected to each other through any form or medium of digital data communication (for example, a communication network). Examples of communication networks include: local area network (LAN), wide area network (WAN) and the Internet.

The computer system can include clients and servers. The client and server are generally far away from each other and usually interact through a communication network. The relationship between the client and the server is generated through computer programs running on the corresponding computers and having a client-server relationship with each other.

According to still another aspect of the embodiments of the present application, an embodiment of the present application also provides a computer program, which includes program codes that, when run by a computer, perform the method according to any one of the above embodiments.

According to still another aspect of the embodiments of the present application, an embodiment of the present application also provides a computer program product including a computer program that, when executed by a processor, implements the method according to any one of the above embodiments.

It should be understood that the various forms of processes shown above can be reordered, with steps being added or deleted. For example, various steps described in the present application can be performed in parallel, sequentially, or in a different order, as long as the desired result of the technical solution disclosed in the present application can be achieved, which is not limited herein.

The above specific implementations do not constitute a limitation on the scope of protection of the present application. Those skilled in the art should understand that various modifications, combinations, sub-combinations, and substitutions can be made according to design requirements and other factors. Any amendments, equivalent substitutions and improvements made within the spirit and principles of the present application shall be included in the scope of protection of the present application.

What is claimed is:

1. An object recognition method, comprising: collecting an object to be recognized;
   identifying, according to a target text detection model corresponding to the object to be recognized, point-of-interest (POI) text information from entire text information corresponding to the object to be recognized; and
   recognizing the POI text information according to a preset text recognition model;
   wherein the recognition is accomplished by:
   generating a detection box corresponding to a collected sample object by adopting an initial text detection model, wherein a subject extraction, an inclination correction, a scaling processing, an image enhancement are performed on the collected sample object in sequence;
   determining, according to the detection box, a detection box corresponding to preset POI text information; and
   recognizing, according to the preset text recognition model, text information corresponding to the determined detection box to obtain a recognition result;
   verifying, according to a first key value pair corresponding to the POI text information, a second key value pair in the recognition result;
   in response to the second key value pair of the recognition result being consistent with the first key value pair corresponding to the POI text information, training the initial text detection model;
   according to the determined detection box to generate the target text detection model.

2. The method according to claim 1, wherein the determining, according to the detection box, a detection box corresponding to preset POI text information comprises:
   performing a modifying operation and/or a deleting operation on the detection box according to the POI text information, wherein the modifying operation comprises at least one of the following: line modification, text modification and four-corner position modification.

3. The method according to claim 2, wherein after the picking out, according to a target text detection model corresponding to the object to be recognized, POI text information from entire text information corresponding to the object to be recognized, the method further comprises:
   determining a text type corresponding to the POI text information;
   and the recognizing the POI text information according to a preset text recognition model comprises:
   selecting a text recognition model corresponding to the text type, and recognizing the POI text information according to the selected text recognition model.

4. The method according to claim 1, wherein after the identifying, according to a target text detection model corresponding to the object to be recognized, POI text information from entire text information corresponding to the object to be recognized, the method further comprises:
   determining a text type corresponding to the POI text information;
   and the recognizing the POI text information according to a preset text recognition model comprises:
   selecting a text recognition model corresponding to the text type, and recognizing the POI text information according to the selected text recognition model.

5. An electronic device, comprising:
   at least one processor; and
   a memory communicatively connected with the at least one processor, wherein:
   the memory stores instructions executable by the at least one processor, and the instructions are executed by the at least one processor to enable the at least one processor to:
   collect an object to be recognized;
   identify, according to a target text detection model corresponding to the object to be recognized, point-of-interest (POI) text information from entire text information corresponding to the object to be recognized; and
   recognize the POI text information according to a preset text recognition model;
   wherein the at least one processor is further enabled to:
   generate a detection box corresponding to a collected sample object by adopting an initial text detection model;
   determine, according to the detection box, a detection box corresponding to preset POI text information, wherein a subject extraction, an inclination correction, a scaling processing, an image enhancement are performed on the collected sample object in sequence; recognize, according to the preset text recognition model, text information corresponding to the determined detection box to obtain a recognition result verify, according to a first key value pair corresponding to the POI text information, a second key value pair in the recognition result and in response to the second key value pair of the recognition result being consistent with the first key value pair corresponding to the POI text information, train the initial text detection model according to the determined detection box to generate the target text detection model.

6. The electronic device according to claim 5, wherein the at least one processor is further enabled to:
   perform a modifying operation and/or a deleting operation on the detection box according to the POI text information, wherein the modifying operation comprises at least one of the following: line modification, text modification and four-corner position modification.

7. The electronic device according to claim 6, wherein the at least one processor is further enabled to:
   determine a text type corresponding to the POI text information;
   and the at least one processor is further enabled to:

select a text recognition model corresponding to the text type, and recognize the POI text information according to the selected text recognition model.

8. The electronic device according to claim 5, wherein the at least one processor is further enabled to:
    determine a text type corresponding to the POI text information;
    and the at least one processor is further enabled to:
    select a text recognition model corresponding to the text type, and recognize the POI text information according to the selected text recognition model.

9. A non-transitory computer-readable storage medium storing computer instructions which are used to cause the computer to:
    collect an object to be recognized;
    identify, according to a target text detection model corresponding to the object to be recognized, point-of-interest (POI) text information from entire text information corresponding to the object to be recognized; and
    recognize the POI text information according to a preset text recognition model;
    wherein the at least one processor is further enabled to:
    generate a detection box corresponding to a collected sample object by adopting an initial text detection model;
    determine, according to the detection box, a detection box corresponding to preset POI text information, wherein a subject extraction, an inclination correction, a scaling processing, an image enhancement are performed on the collected sample object in sequence; recognize, according to the preset text recognition model, text information corresponding to the determined detection box to obtain a recognition result verify, according to a first key value pair corresponding to the POI text information, a second key value pair in the recognition result; and in response to the second key value pair of the recognition result being consistent with the first key value pair corresponding to the POI text information, train the initial text detection model according to the determined detection box to generate the target text detection model.

* * * * *